(12) United States Patent
Azmoon

(10) Patent No.: US 10,353,549 B2
(45) Date of Patent: Jul. 16, 2019

(54) PREDICTIVE WATCH FACE INTERFACE

(71) Applicant: ServiceNow, Inc., Santa Clara, CA (US)

(72) Inventor: Troy Azmoon, Carlsbad, CA (US)

(73) Assignee: SERVICENOW, INC., Santa Clara, CA (US)

( * ) Notice: Subject to any disclaimer, the term of this patent is extended or adjusted under 35 U.S.C. 154(b) by 104 days.

(21) Appl. No.: 15/593,580

(22) Filed: May 12, 2017

(65) Prior Publication Data

US 2017/0329636 A1 Nov. 16, 2017

Related U.S. Application Data

(60) Provisional application No. 62/335,927, filed on May 13, 2016.

(51) Int. Cl.

| G06F 9/48 | (2006.01) |
|---|---|
| G06F 15/02 | (2006.01) |
| G06F 3/0482 | (2013.01) |
| G06F 11/07 | (2006.01) |
| H04L 29/08 | (2006.01) |
| G06F 3/0484 | (2013.01) |

(52) U.S. Cl.
CPC ........ G06F 3/0482 (2013.01); G06F 3/04842 (2013.01); G06F 3/04845 (2013.01); G06F 3/04847 (2013.01); G06F 9/4887 (2013.01); G06F 15/02 (2013.01); G06F 15/0208 (2013.01); G06F 11/0709 (2013.01); H04L 67/22 (2013.01)

(58) Field of Classification Search
None
See application file for complete search history.

(56) References Cited

U.S. PATENT DOCUMENTS

| 2016/0034133 A1* | 2/2016 | Wilson .................. G06F 3/0488 715/772 |
|---|---|---|
| 2016/0034152 A1* | 2/2016 | Wilson ................ G06F 3/04845 715/835 |
| 2016/0357282 A1* | 12/2016 | Block ..................... G06F 1/163 |
| 2016/0357413 A1* | 12/2016 | Block ................... G06F 3/0482 |
| 2016/0357420 A1* | 12/2016 | Wilson ................ G06F 3/04847 |
| 2017/0053542 A1* | 2/2017 | Wilson .................... G09B 5/02 |

* cited by examiner

*Primary Examiner* — Qing Yuan Wu

(74) *Attorney, Agent, or Firm* — Fletcher Yoder PC

(57) ABSTRACT

Systems, methods, and media related to utilizing a wearable device to monitor a remote system include receiving historical data related to operation of a remote system. The historical data includes recorded events occurring in the past. Predictive data is also received. The predictive data relates to operation of the remote system. Moreover, the predictive data includes an indicator of a predicted breach of a condition in the future. The historical and predictive data is displayed on the wearable device along with a graphical indicator for the predicted breach.

21 Claims, 14 Drawing Sheets

PREDICTIVE WATCH FACE INTERFACE

CROSS-REFERENCE TO RELATED APPLICATIONS

This application claims the benefit of Provisional Application Ser. No. 62/335,927, filed May 13, 2017, entitled "Predictive Watch Face Interface," which is incorporated by reference herein in its entirety.

TECHNICAL FIELD

The present disclosure is generally related to a predictive watch face interface and associated systems and methods.

BACKGROUND

A distributed computing environment may be configured to host an application instance that can provide platform and application level functionality to customers and users. For example, task-management or information technology service management (ITSM) applications can be provided through the application instance. The application instance may be implemented on one or more server devices and accessed through a network, such as a computer network, by a client device. The application instance may be accessed in various ways such as through a web interface that is provided by the application instance. More than one application instance can be provisioned within the distributed computing environment. The application instance may be accessed, executed, or stored on one or more server devices within the distributed computing environment. Mobile devices can be configured to access an application instance through a network interface (e.g., a wireless network interface). Watch devices are available that have a display, user interface functionality, and wireless connectivity to send and receive data from a device (e.g., a mobile device).

SUMMARY

Disclosed herein are aspects of a predictive watch face interface and associated systems and methods.

In an implementation, a system for providing a predictive watch interface is provided. The system includes a watch device having a processor, memory, wireless network interface, human input interface, and a display. The watch device memory includes instructions executable by the watch device processor to receive a historical data set and a predictive data set using the wireless network interface, wherein the historical data set relates to a time period before a current time, the predictive data set relates to a time period after a current time, and the predictive data set includes an indicator of a predicted breach of a condition relating a predicted breach time after the current time, to render the historical data set along a first axis disposed along a first portion proximate to a first edge of the display, to render the predictive data set along a second axis disposed along a second portion proximate to the first edge of the display, the first portion adjacent to the second portion, to render a graphical indicator proximate to the second axis based on the predictive breach time, to receive an input from the human input interface relating to the predicted breach, and to transmit a signal to a server device using the wireless network interface to create a task in task-management application software executed by a processor included in the server.

In an implementation, a method for providing a predictive watch interface is provided. The method includes generating, by a server device, a historical data set and a predictive data set, wherein the historical data set relates to a time period before a current time, the predictive data set relates to a time period after a current time, and the predictive data set includes an indicator of a predicted breach of a condition relating a predicted breach time after the current time, transmitting the historical data set, predictive data set, and the indicator of the predicted breach from the server device using a network interface of the server device to a watch device having a processor, memory, wireless network interface, human input interface, and a display, receiving a signal to create a task in a task-management application software executed by the server processor, the signal sent using the wireless network interface of the watch device by the network interface of the server device, wherein the transmitting causes the watch device to render the historical data set along a first axis disposed along a first portion proximate to a first edge of the display, render the predictive data set along a second axis disposed along a second portion proximate to the first edge of the display, the first portion adjacent to the second portion, and render a graphical indicator proximate to the second axis based on the predictive breach time, wherein the signal is generated by the watch device responsive to an input from a human input interface of the watch device relating to the predicted breach.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

In an implementation, an application instance or multiple application instances may be executed on one or more application and database nodes which may be hosted on one or more servers. An application instance may be accessible to client devices through a network. In an implementation, interaction with the application instance may be performed through a web interface that is configured to authenticate access, display content, and facilitate inputs and outputs to and from the application instance. An application instance can, for example, include an implementation of platform software executing on one or more application nodes which can provide a framework on which issues and events related to the management of information technology resources including aspects of technical support, logistics, personnel, organizational structure, and infrastructure may be managed.

An application instance can, for example, include an implementation of task-management or information technology service management (ITSM) applications which may be used to organize and manage issues relating to the corresponding information technology services and the provision of associated materiel associated with the information technology services.

The management of information technology resources, including the people and equipment associated with those resources, necessitates careful tracking of the resources and issues relating to the usage of those resources. In an implementation, these issues may include issues relating to the need for technical support, equipment provisioning (e.g. servers, or other hardware), or the allocation of resources as needed. An ITSM system may be implemented to keep track of these issues and efficiently manage their resolution. As businesses become more agile and management of such issues becomes decentralized, there may exist a need for a way to handle such issues on the go, or away from a centralized control center (such as a call center).

Wearable technology, such as a watch device, provide an effective way to receive, track, and manage, data relating to information technology resources. In an implementation, a watch device may be configured to receive data such as historical data relating to past events and predictive data including a breach criterion relating to the breach of a criterion that may occur after the current time. In an implementation, the breach criterion may be set by a user. The watch device may render the historical data and predictive data in an accessible format, and may provide notifications relating to the breach criterion. When a breach is indicated, a user may input instructions, which may be transmitted to a connected device such as a server, where further action may be taken to resolve an issue related to the event.

Figure 1:
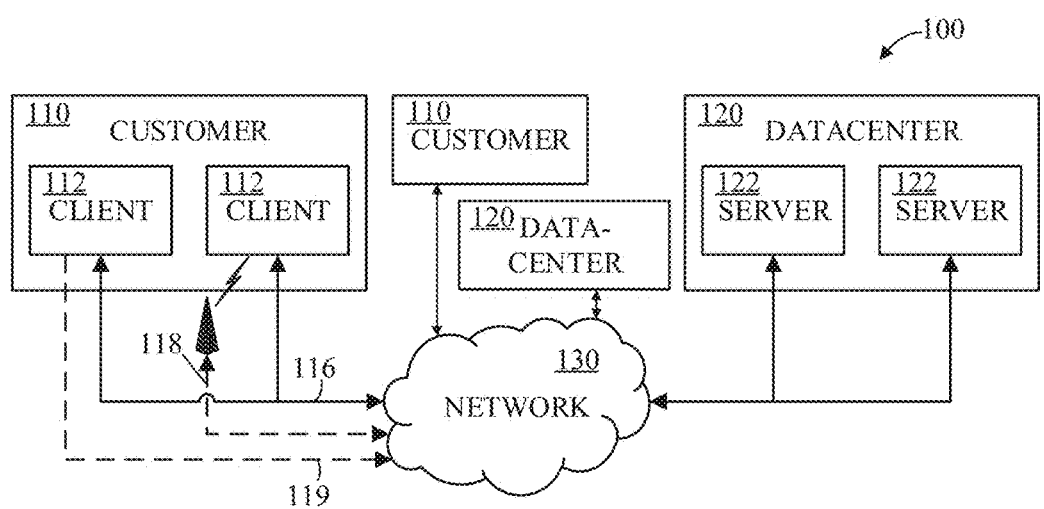
FIG. 1 is a block diagram of a distributed or cloud computing system.

To describe some implementations in greater detail, reference is first made to examples of hardware structures and interconnections usable in implementations of the present disclosure. FIG. 1 is a block diagram of a distributed or cloud computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as client devices 112. Each of client devices 112 can be in the form of a computing system including multiple computing devices, or in the form of a single computing device, for example, a mobile phone, a tablet computer, a laptop computer, a notebook computer, a desktop computer, and the like. Customer 110 and client devices 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as server device 122. Each datacenter 120 may represent a facility in a different geographic location where servers are located. Each of server devices 122 can be in the form of a computing system including multiple computing devices, or in the form of a single computing device, for example, a desktop computer, a server computer, a virtual machine and the like. The datacenter 120 and server devices 122 are examples only, and a cloud computing system may have a different number of datacenters and servers or may have a different configuration of datacenters and servers. For example, there may be tens of datacenters and each datacenter may have hundreds or any number of servers.

Client devices 112 and server devices 122 may be configured to connect to network 130. The clients 112 for a particular customer may connect to network 130 via a common connection point 116 or different connection points (e.g. a wireless connection point 118 and a wired connection point 119). Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of client devices 112 and server devices 122. Network 130, datacenter 120 and/or blocks not shown may include network hardware such as routers, switches, load balancers and/or other network devices.

Other implementations of the cloud computing system 100 are also possible. For example, devices other than the clients 112 and servers 122 shown may be included in cloud computing system 100. In an implementation, one or more additional servers may operate as a cloud infrastructure control, from which servers 122 and/or clients 112 of the cloud infrastructure are monitored, controlled and/or configured. For example, some or all of the techniques described herein may operate on said cloud infrastructure control servers. Alternatively, or in addition, some or all of the techniques described herein may operate on servers such as server devices 122.

Figure 2:
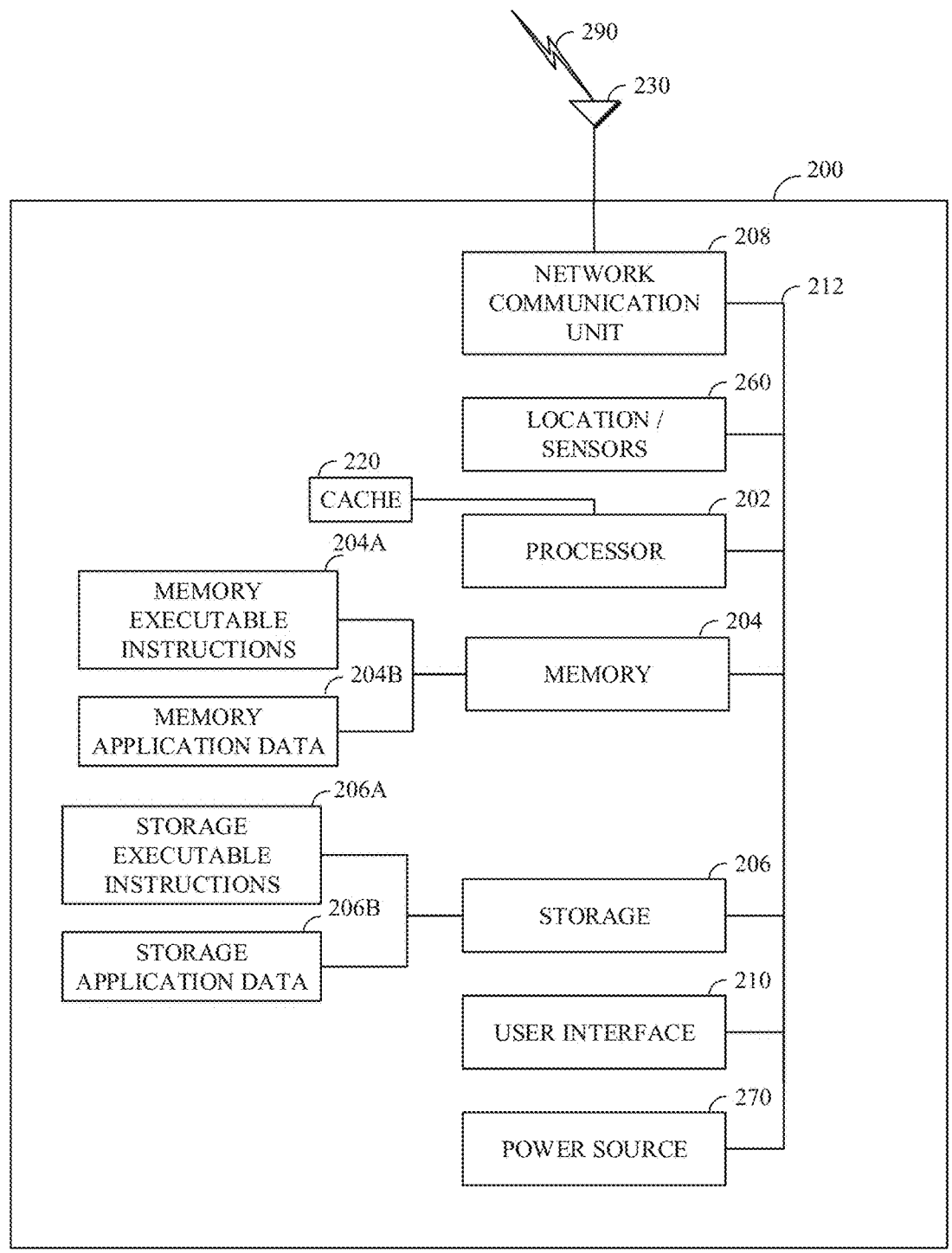
FIG. 2 is a block diagram of an implementation of an internal configuration of a computing device, such as a computing device of the computing system as shown in FIG. 1.

FIG. 2 is a block diagram of an implementation of an internal configuration of a computing device 200, such as a client device 112 or server device 122 of the cloud computing system 100 as shown in FIG. 1, including an infrastructure control server of a computing system. As previously described, client devices 112 or server devices 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network. The CPU 202 can be a general-purpose processor or a special-purpose processor.

Random Access Memory (RAM) 204 can be any suitable non-permanent storage device that is used as memory. RAM 204 can include executable instructions and data for access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid-state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux® operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid-state-type or magnetic-type storage devices.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, or the like to effect communications between devices. The interface 230 can comprise one or more transceiver(s) that utilize the Ethernet, power line communication (PLC), Wi-Fi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to user interface 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of client devices 112 and server devices 122 are also possible. For example, servers may omit user interface 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
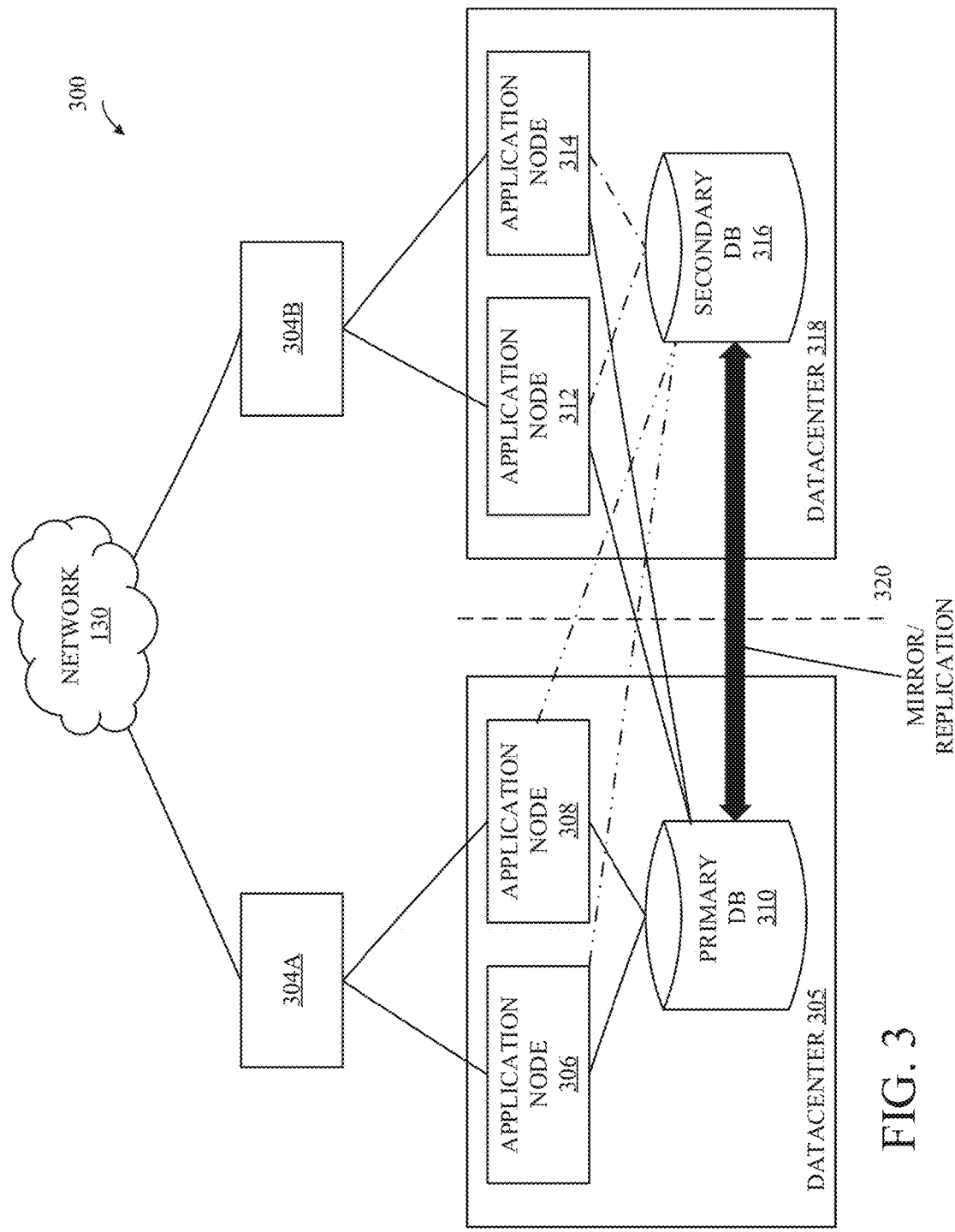
FIG. 3 is a block diagram of an implementation of a high availability processing system.

FIG. 3 is a block diagram of an implementation of a high availability processing system. The illustrated distributed computing system 300 can be, for example, an implementation of datacenter 120 and network 130 of FIG. 1. Broadly, the system 300 includes load balancers 304A-304B and two datacenters 305, 318. The load balancers 304A-304B are coupled to a telecommunications network graphically depicted by network 130. Load balancers 304A-304B may also include reverse proxy load balancers.

The datacenter 305 includes a database 310, and the datacenter 318 includes a secondary database 316. The datacenters 305, 318 operate in such a manner that the secondary database 316 can provide an exact or substantially exact mirror of the database 310. A line 320 is used to graphically emphasize the logical boundary between datacenters 305 and 318. Depending upon the intended application, the databases 310, 316 may be implemented using, for example, a relational database management system (RDBMS), an object database, an XML database, flat files, or the like.

Each datacenter can include application nodes 306, 308, 312, 314, although a greater or lesser number can be used depending on the implementation. The application nodes can be implemented using processing threads, virtual machine instantiations, or other computing features of the datacenters that run programs on behalf of remotely sited clients, and exchange related data with such clients via the network 130. In connection with running these programs, occasions arise for the application nodes to store and retrieve data, with database 310 and database 316 filling this role. In an implementation, each of the application nodes connects to a single primary database, regardless of whether said database is located in the same datacenter as said application node. For example, a primary database may be read/write and a secondary database may be configured to be read-only such that it mirrors changes from the primary database. Requests to the system 300 may be routed to the application nodes in the datacenter of the primary database first, followed by the other datacenter. In a failover situation, the secondary database may become read/write with the formerly primary database switched to mirror the secondary database (which becomes the primary database). In this situation, each application node can be reconfigured to point to the secondary database (now the primary database) as shown by the dashed lines.

As mentioned above, each datacenter 305, 318 may have its own load balancer 304A-304B. Each load balancer may be configured to direct traffic to respective servers and processing nodes located within its datacenter. In regard to proxy services, in one example the load balancers 304A-304B are configured to provide a single Internet-delivered service to remote clients via the network 130, where this service is actually provided by a server farm composed of the computerized servers of the datacenters 305, 318. The load balancers 304A-304B also coordinate requests from remote clients to the datacenters 305, 318, simplifying client access by masking the internal configuration of the datacenters. The load balancers 304A-304B may serve these functions by directing clients to processing nodes as configured directly or via DNS. Load balancer 304A-304B can be configured for sticky sessions. With sticky sessions, requests from a client can be forwarded to the same application node 306, 308 for the duration of the client session.

In regard to load balancing, the load balancers 304A-304B can be configured to direct traffic to the secondary datacenter in the event the datacenter 305 experiences one of many enumerated conditions predefined as failure. The load balancing functionality of the load balancers 304A-304B can be provided as separate components or as a single component.

Figure 4:
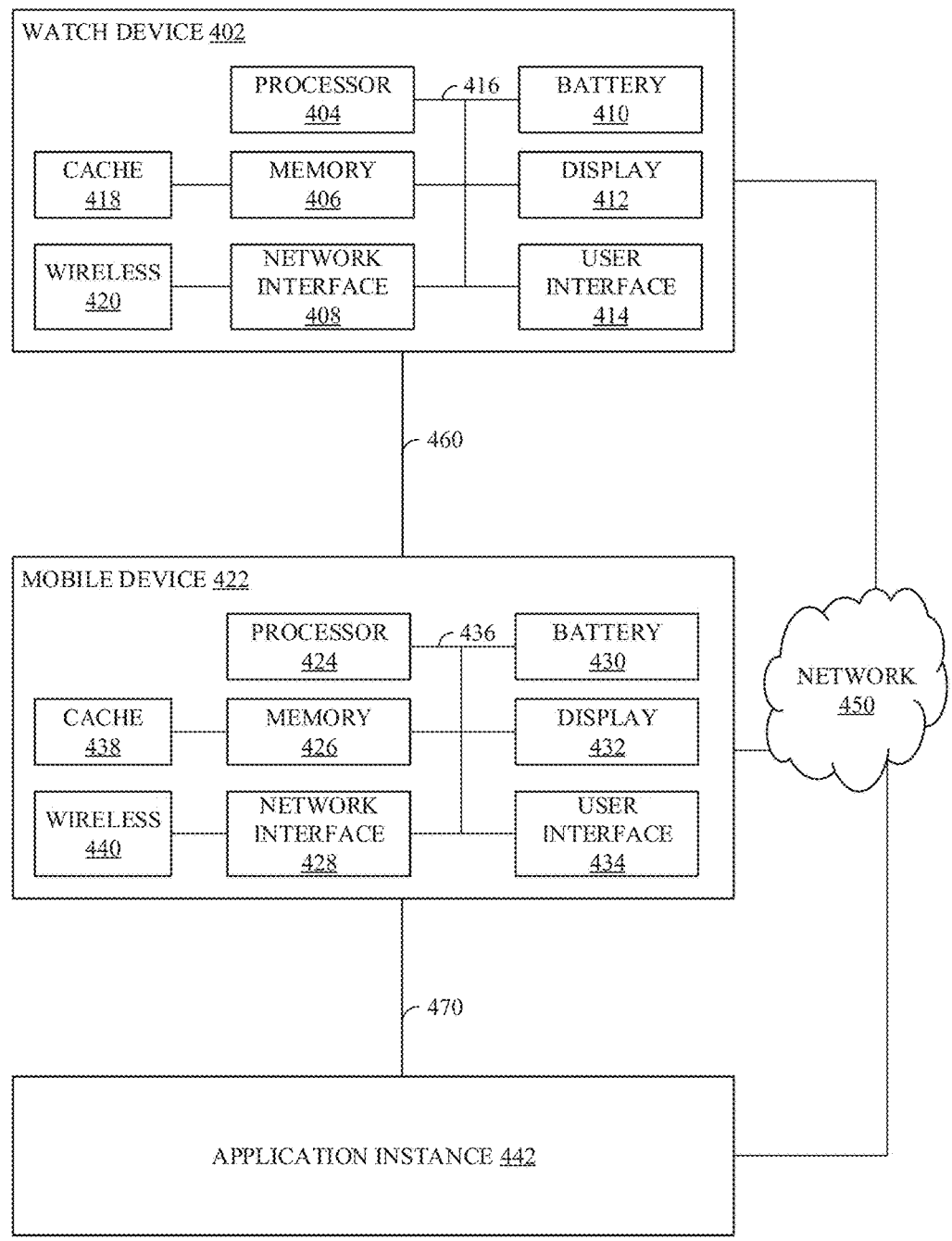
FIG. 4 is a block diagram of an implementation of a system including a watch device, mobile device, and application instance.

FIG. 4 is a block diagram of components including a watch device 402, mobile device 422, and application instance 442.

Watch device 402 may include a number of components, as illustrated in FIG. 4. Processor 404 can be a central processing unit, such as a microprocessor, and can include single or multiple processors, each having single or multiple processing cores. Alternatively, processor 404 can include another type of device, or multiple devices, capable of manipulating or processing information now-existing or hereafter developed. When multiple processing devices are present, they may be interconnected in any manner, including hardwired or networked, including wirelessly networked. Thus, the operations of processor 404 can be distributed across multiple machines that can be coupled directly or across a local area or other network. The processor 404 can be a general-purpose processor or a special-purpose processor.

Memory (or RAM) 406 can be any suitable non-permanent storage device that is used as memory. Memory 406 can include executable instructions and data for access by processor 404. Memory 406 typically comprises one or more DRAM modules such as DDR SDRAM. Alternatively, memory 406 can include another type of device, or multiple devices, capable of storing data for processing by processor 404 now-existing or hereafter developed. processor 404 can access and manipulate data in memory 406 via bus 416, which may be a bus such as the bus 416. The processor 404 may utilize a cache, such as cache 418, as a form of localized fast memory for operating on data and instructions.

The watch device 402 can include one or more input/output devices, such as a network interface 408 that may have a wireless communications component 420, which can be coupled to CPU 404 via bus 416. The communications component 420 can utilize any of a variety of standardized network protocols, such as TCP/IP, or the like to effect communications between devices. The network interface 408 can comprise one or more transceiver(s) that utilize technologies such as Ethernet, Bluetooth, Wi-Fi, infrared, GPRS/GSM, CDMA, etc.

The watch device 402 can include a battery 410, so that the unit can operate in a self-contained manner. These may communicate with the processor 404 via the bus 416

The watch device 402 can include a display 412, which may be implemented in various ways, including by a liquid crystal display (LCD) or a cathode-ray tube (CRT) or light emitting diode (LED) display, such as an OLED display. In an implementation, the display 412 may be coupled with user interface 414 through bus 416.

The watch device 402 can include a user interface 414, which may include an accelerometer, button, digital crown, touchscreen or other forms of input and output. The user interface 414 can be coupled to the processor 404 via the bus 416.

Mobile device 422 may include a number of components, as illustrated in FIG. 4. processor 424 can be a central processing unit, such as a microprocessor, and can include single or multiple processors, each having single or multiple processing cores. Alternatively, processor 424 can include another type of device, or multiple devices, capable of manipulating or processing information now-existing or hereafter developed. When multiple processing devices are present, they may be interconnected in any manner, including hardwired or networked, including wirelessly networked. Thus, the operations of processor 424 can be distributed across multiple machines that can be coupled directly or across a local area or other network. The processor 424 can be a general-purpose processor or a special purpose processor.

Memory (or RAM) 426 can be any suitable non-permanent storage device that is used as memory. Memory 426 can include executable instructions and data for access by processor 424. Memory 426 typically comprises one or more DRAM modules such as DDR SDRAM. Alternatively, memory 426 can include another type of device, or multiple devices, capable of storing data for processing by processor 424 now-existing or hereafter developed. processor 424 can access and manipulate data in memory 426 via bus 436. The processor 424 may utilize a cache, such as cache 438, as a form of localized fast memory for operating on data and instructions.

The mobile device 422 can include one or more input/output devices, such as a network interface 428 that may have a wireless communications component 440, which can be coupled to CPU 424 via bus 436. The wireless communications component 440 can utilize any of a variety of standardized network protocols, such as TCP/IP or the like to effect communications between devices. The network interface 428 can comprise one or more transceiver(s) that utilize technologies such as Ethernet, Bluetooth, Wi-Fi, infrared, GPRS/GSM, CDMA, etc.

The mobile device 422 can include a battery 430, so that the unit can operate in a self-contained manner. These may communicate with the processor 424 via the bus 436

The mobile device 422 can include a display 432, which may be implemented in various ways, including by a liquid crystal display (LCD) or a cathode-ray tube (CRT) or light emitting diode (LED) display, such as an OLED display. In an implementation, the display 432 may be coupled with user interface 434 through bus 436.

The mobile device 422 can include a user interface 434 which may include an accelerometer, button, digital crown, touchscreen, keyboard or other forms of user input and output devices. The user interface 434 can be coupled to the processor 424 via the bus 436.

In an implementation, watch device 402 or mobile device 422 can be configured to access an application instance. In an implementation, application instance 442 is a type of application instance providing access to an application, such as a task-management or an issue tracking management system. For example, the application instance may permit a user to interact with, modify and view data stored in the application or system. In an implementation, application instance 442 can be implemented using one or more of the devices and systems described in FIGS. 1-3.

In an implementation, watch device 402 or mobile device 422 can be configured to access an application instance, such as application instance 442, via network 450, although other forms of accessing the application instance 442 may be used. In an alternative implementation, watch device 402 or mobile device 422 may exchange signals including data, with an application instance, such as application instance 442, through a direct connection, such as direct connection 460 with mobile device 422, which may send signals to application instance 442 through direct connection 470. In an implementation, direct connection 460 or direct connection 470 may be peer-to-peer connections such as Bluetooth or other wireless connections, although other types of direct connection for the transmission of signals may be used.

Figure 5:
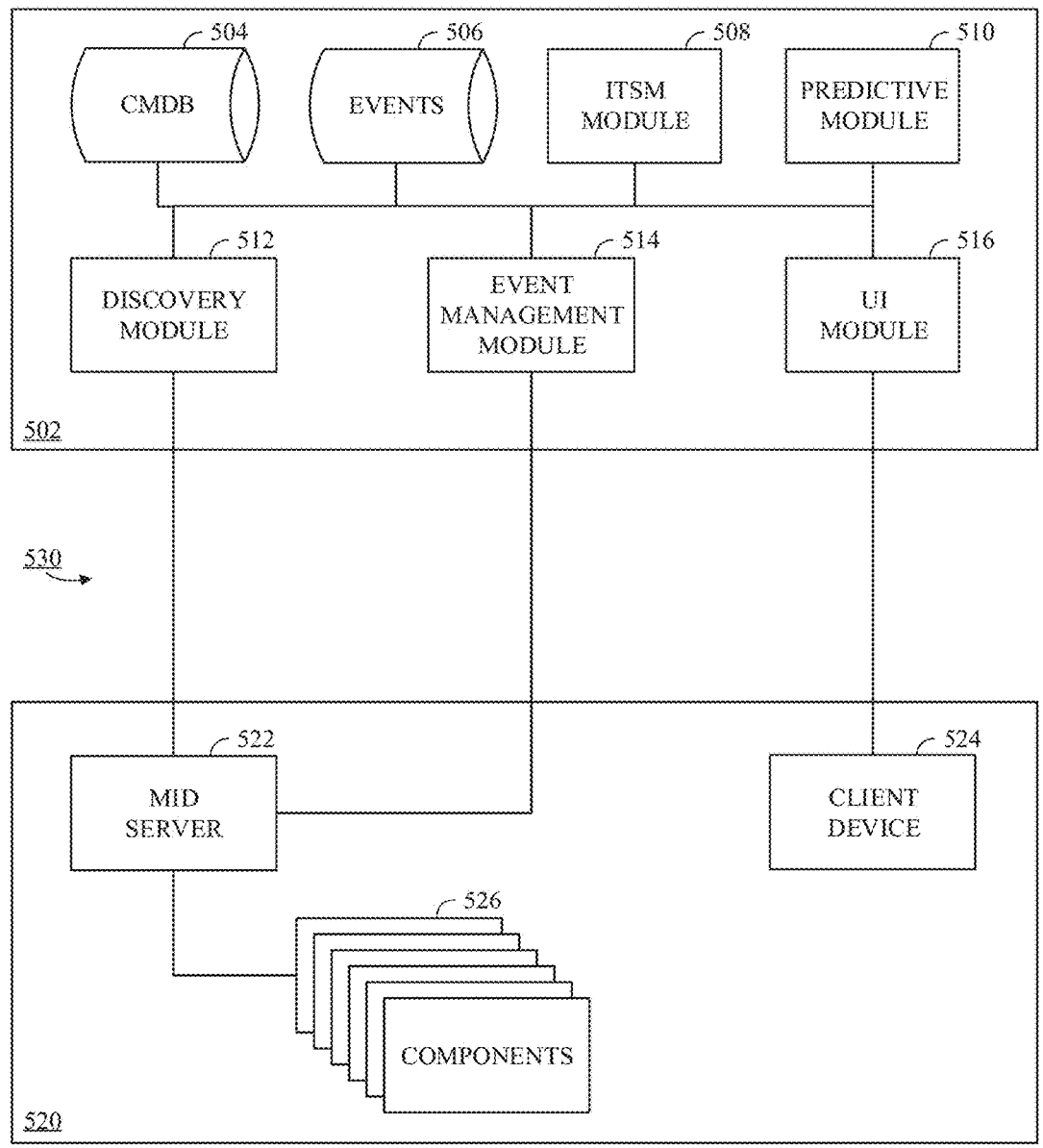
FIG. 5 is a block diagram of an implementation of a system associated with a predictive watch interface.

FIG. 5 is a block diagram of an implementation of a system associated with a predictive watch interface. Service provider environment 502 can include CMDB 504, Events 506, ITSM module 508, predictive module 510, discovery module 512, event management module 514, UI module 516, or a combination thereof. In an implementation, service provider environment 502 can be implemented using datacenter 120 and servers 122, computing device 200, distributed computing system 300, application instance 442, or a combination thereof.

Customer environment 520 can include MID server 522, client device 524, components 526, or a combination thereof. In an implementation, customer environment 520 can be implemented using customer 110 and MID server 522, client device 524, and components 526 can be implemented using client 112, computing device 200, or a combination thereof. In an implementation, customer environment 520 is or includes a network-connected computing infrastructure which includes components 526. Components 526 can include network-connected devices, such as but not limited to those described above with respect to FIG. 2 or below with respect to FIG. 6. Components 526 can include software modules, firmware, or other components installed on or executing within network-connected device components.

Customer environment 520 can be in communication with service provider environment 502 such as by way of a network. Such a network can be a WAN, LAN, point-to-point link, or any other network link capable of permitting communication between network interfaces of devices within the customer environment 520 with network interfaces of devices within the service provider environment 502.

In an implementation, the service provider environment is an on-premises software installation. In such an implementation, the service provider environment can be within or in close communication with the customer environment 520 and/or can be more controlled by the customer for which customer environment 520 is associated. In an implementation, the service provider environment is administered by a third-party service provider. In an implementation, the service provider environment 502 is implemented using an instance of application software and database schema and records within a single-tenant hosted environment.

In an implementation, CMDB 504 includes records of configuration items (CIs) and relationships between CIs. Information within the CMDB 504 can be populated using, for example, a discovery process. In an implementation, discovery module 512 can perform the discovery process in conjunction with MID server 522. Discovery module 512 can cause the MID server 522 to send probes into the network-connected computing infrastructure of the customer environment 520 to identify network-connected devices and to collect information about network-connected devices, such as attributes of the devices and software modules executing on or installed on said devices. The information returned by the probe can be processed by a sensor (e.g., a sensor operating on the MID server 522), by the discovery module 512, or a combination thereof. The processed information can be used to update CMDB 504. The discovery process can, for example, be a horizontal discovery process whereby all devices within a particular scope, segment, subset, or range are discovered, or a contextual discovery process whereby devices and software are iteratively discovered starting from an entry point to a service provided to the discovery process.

In an implementation, events 506 includes records of events received or generated by event management module 514. Event management module 514 can receive alerts, events, or other indications of the operation of components (e.g., components 526) in customer environment 520 from event sources in the customer environment 520. Event management module 514 can be configured to receive events from MID server 522, directly from event sources within or outside of customer environment 520, or a combination thereof.

In an implementation, ITSM module 508 can be an implementation of an information technology service management (ITSM) application, such as one including practices set forth in the Information Technology Infrastructure Library (ITIL) promulgated by AXELOS. For example, ITSM module 508 can provide functionality for entering, viewing, and tracking incidents, problems, and changes within a network-connected computing infrastructure. For example, incidents can relate to issues encountered by users of the computing infrastructure and can be generated in response to incidents (e.g., a contact with a help desk or interaction with the ITSM system). An incident can be regarding current or past issues (e.g., "my e-mail client does not work") or prospective or future issues (e.g., "my disk space is getting low"). For example, problems can relate to a collection of incidents or an indication of a particular problem in a computing environment. For example, many users may have incidents that their e-mail does not work whereas a problem may indicate that the e-mail server has a specific problem that might be causing the incidents (e.g., low disk space). A change can relate to a change that is to be made to a computing infrastructure, such as the addition of a hard drive to remediate a low disk space condition. A change can require approvals before it is implemented. Incident, problems, and changes are provided as examples only and other types of records can be included or used within the context of ITSM module 508.

The records in ITSM module 508 can be based on a generic task record structure to which specific attributes or records for incident, problem, change, and other types of tasks can be built upon. For example, the use of a common base task record implementation can permit for common or similar processing of different types of task records. While ITSM module 508 has been described as an ITSM implementation, any type of task-management system can be used in place of or in addition to ITSM module 508. For example, ITSM module 508 may relate to service management in use cases other than information technology, such as HR, Legal, or Facilities.

Predictive module 510 can be configured to predict a predictive data set for a future time period for a variable such as an indicator, key performance indicator, or other variable. The predictive data set can be generated based on one or more historical data sets relating to past and/or current time periods that can, for example, be maintained by predictive module 510, ITSM module 508, events 506, CMDB 504, or a combination thereof. The predictive data set can relate, for example to an aggregate indicator of records stored by or in ITSM module 508, such as a number of incidents open over time, a number of incidents marked as critical over time, a number of incidents that are past a service level agreement (SLA) condition over time, or other value measured over time. The historical or predictive data set can instead or in addition relate to other types of records, such as a number of alerts or events received in the past and that are predicted to be received in the future. For example, a predictive data set can predict a value for an indicator at particular time intervals, such as every minute, 5 minutes, 15 minutes, 30 minutes, variable time interval, or other time interval. The predictive data set can be generated by predictive module 510 using, for example, interpolation, machine learning, other techniques, or combinations thereof.

UI module 516 can be configured to generate graphical user interface information for transmission to client device 524 or other devices. For example, UI module 516 can be configured to generate graphical user interface information for mobile device 422 or watch device 402. For example, UI module 516 can generate forms, lists, task boards, chat interfaces, reports, dashboards, portals or other types of user interface screens and elements thereon based on data stored in or controlled by CMDB 504, Events 506, ITSM module 508, predictive module 510 and the like. UI module 516 can be configured to generate or transmit graphical elements that are directly rendered on a display of client device 524 or other device or may be configured to, instead of or in addition, to generate or transmit instructions that can be used by such devices to render a graphical display to a display device or to generate or transmit data that can be used by such devices to render a graphical display based on instructions already stored in such devices, such as in a native mobile or watch application.

The system depicted in FIG. 5 is exemplary of certain implementations of systems associated with a predictive watch interface. Other implementations are available that, for example, combine, modify, omit, or add modules, components or devices. For example, discovery module 512 can be omitted from an implementation or other modules can be provided for updating CMDB 504, such as a data import module. For example, MID server 522 can be omitted or additional MID server 522 can be added. For example, additional components and links between components other than shown by components 526 can be added.

Figure 6A:
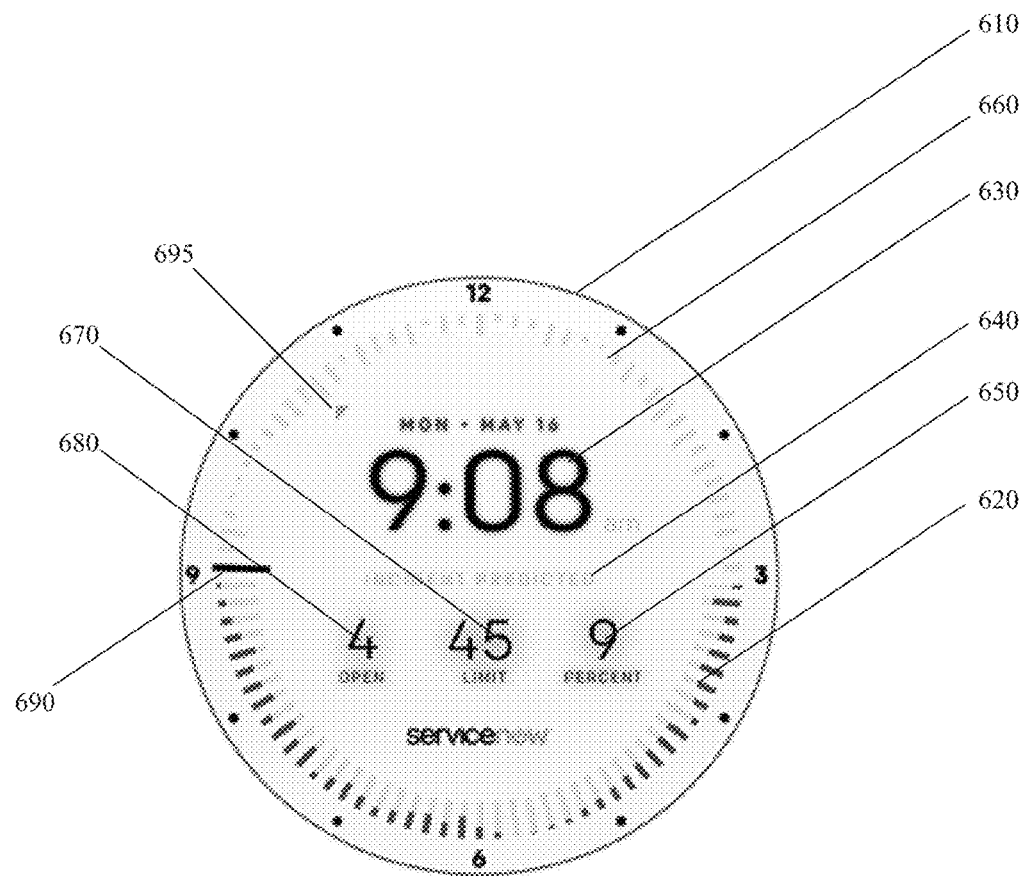
FIG. 6A is an illustration of a watch display area of a graphical user interface that can be output to the display of a watch device.

FIG. 6A is an illustration of a watch display area 610 of graphical user interface that can be output to the display of a watch device. In an implementation, the watch display area 610 may be round or polygonal and may include a monochromatic or color display, although other shapes or types of display may be used. Additionally, the watch display area 610 may include a current time 630, which may display the current time 630, a date, or a combination thereof. While a digital indication of time is depicted in current time 630, an analog representation of time may also be used. In an implementation, the elements displayed on watch display area 610 may be configured from an external device, such as the mobile device 422.

In an implementation, the watch display area 610 may be used to display data such as historical data 620 which may relate to a time period before the current time 630 and may include data relating to one or more conditions or one or more events, which may be associated with the time period before the current time 630, although the historical data 620 may include other types of data. In an implementation, the historical data 620 may include aggregate indicator data or other historical data such as described above with respect to FIG. 5. In an implementation, the historical data 620 may be represented as a line graph or bar graph, although other ways to represent the predictive data may be used. Further, the historical data 620 may be placed proximate or adjacent to the edge or perimeter of the watch display area 610, although in alternative implementations, the historical data 620 may be located elsewhere on the watch display area 610.

In an implementation, predictive data 660 may display a time period after the current time 630 and may include data relating to one or more conditions or one or more events, which may be associated with the time period after the current time 630, although the historical data may include other types of data. In an implementation, the predictive data 660 may be represented as a line graph or bar graph, although other ways to represent the predictive data may be used. Further, the predictive data 660 may be proximate or adjacent to the edge or perimeter of the watch display area 610, although in alternative implementations, the historical data 660 may be located elsewhere on the watch display area 610.

In an implementation, the historical data 620 is plotted along a first axis disposed proximately to an edge of the watch display area 610. The first axis can extend along a first portion of the edge of the watch display area 610, such as 180 degrees of arc or a specified distance based on the size and circumference of watch display area 610. In an implementation, the predictive data 660 is plotted along a second axis disposed proximately to an edge of the watch display area 610. The second axis can extend along a second portion of the edge of the watch display area 610, such as 180 degrees of arc or a specified distance based on the size and circumference of watch display area 610.

The proportion of historical and predictive data can be configured (e.g., instead of 50% each as shown, 80% of the data may be shown as predictive and 20% may be shown as historical, the two axes being adjusted accordingly). In addition, the axes may be configured to not cover the entire edge of a device (e.g., there may be a space between the first and second axes opposite the current time). The first axis and second axis can be disposed adjacent to each other. In an implementation, the watch face can be configured with a touchscreen interface designed to recognize gestures that can be used to adjust the time period of the first and/or second axes, such as by swiping clockwise/counter clockwise or in opposite directions.

In an implementation, an indication 690 can be provided that identifies the boundary between the two axes, which can, for example, indicate a current time.

In an alternative implementation, the predictive data 660 may be superimposed over the historical data 620, and may be distinguished through the use of a different color (e.g. blue for historical data 620 and red for predictive data 660), although other ways of distinguishing the historical data 620 from the predictive data 660 may be used.

Figure 6B:
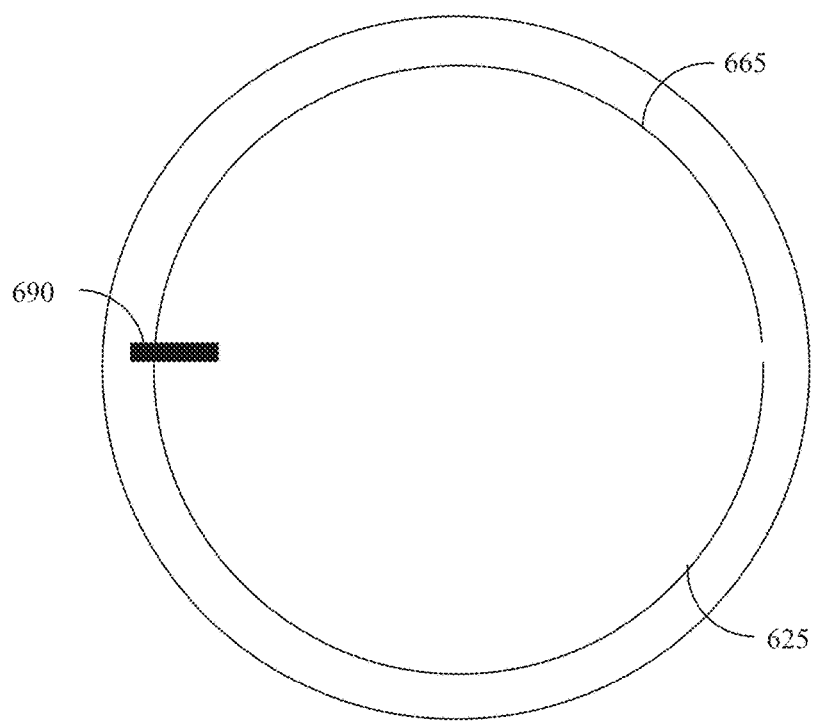
FIG. 6B is a schematic of a watch display area of a graphical user interface that can be output to the display of a watch device.

FIG. 6B is a schematic of a watch display area 610 of graphical user interface that can be output to the display of a watch device. Shown on the schematic is a first axis 625 which can be used to plot, e.g., historical data 620 and a second axis 665 which can be used to plot, e.g., predictive data 660, such as in a bar graph form such as shown in FIG. 6A.

Referring back to FIG. 6A, in an implementation, watch display area 610 may include a notification area 640 which may be used to display a notification related to the one or more conditions or one or more events. In an implementation, a vibration or other haptic output can be generated or produced when a notification is indicated.

In an implementation, status data 650 may provide an indication of events or conditions that remain unresolved. In an implementation, this indication may be a summary that includes tasks that remain to be completed or the portion of resources, such as computing resources, with unresolved incidents. In an implementation, the events or conditions may be related to incidents in a module (e.g., ITSM module 508).

In an implementation, threshold data 670 may be used to display a threshold criterion, such as the maximum number of the one or more events or one or more conditions that are unresolved in one or more time periods. In an implementation, the events or conditions may be related to incidents in a module (e.g., ITSM module 508).

In an implementation, pending task data 680 may be used to indicate the events or conditions that are currently open. In an implementation, the events or conditions may be related to incidents in a module (e.g., ITSM module 508).

In an implementation, a user input relating to data 650, 670, or 680, (e.g., input via a touch on a touchscreen interface proximate to 650, 670 or 680) may cause the display of data relating to the pending tasks such as the name of the pending task or the predicted completion time of the pending task. In an implementation, the user input may instead or in addition cause the display of data on an associated mobile device (e.g., mobile device 422).

Data 650, 670, or 680 may be related to the historical data 620 and predicted data 660. For example, data 650, 670, or 680 can indicate data as of a current time as compared to related data included in historical data 620 and predicted data 660.

In an implementation, the time scale of the historical data 620 or the predictive data 660 may be synchronized with a watch face time period (e.g., 12 hours, aligned as shown in FIG. 6A). For example, indication 690 and/or the boundary between the first and second axes and data sets can be placed at a current time. For example, in FIG. 6A, the time is 9:08 am and indication 690 is placed just past the 9 marking on the watch face. In such an implementation, predictive data 660 can be plotted after the current time and historical data can be plotted before the current time. In an implementation, the time scale of the axes can be different from a typical 12-hour watch face. For example, the 360 degrees about the watch face can represent 24 hours, one week, one year, or the like. In such cases, the indicators around the edge of the watch face can change relative to the period (e.g., to Q1, Q2, Q3, Q4 or JFMAMJJASOND in the case of a one-year time period). In such an implementation January 1 can be aligned at the 12 o'clock position, and the indication 690 and/or the boundary between the first and second axes can be placed at a current date (e.g., if April 1, at the 3 o'clock position).

In an implementation, the indication 690 and/or the boundary between the first and second axes can be placed at a location decoupled from a watch face indication of current time. For example, the indication 690 can be placed at the 12 o'clock position and the predictive and historical data can be plotted on either side.

In an implementation, a user may select data points on the historical data 620 or predictive data 660 by touching the corresponding graph, thereby displaying additional data about that point in time, such as an incident number. The additional data may be transmitted to another device such as a mobile device, which may be used to display the additional data.

In an implementation, the watch display area 610 can provide an indication 695 to the user of anticipated issues (e.g., to inform the user that in 1 or 2 hours, that he may need to take action so the user knows that he/she should be back in the office by that time). For example, the application instance could be configured to vibrate the watch a pre-set time before an issue is predicted, or at a time based on the user's current distance from the office, for example.

Figure 7:
FIGS. 7-11 are depictions of exemplary predictive watch face interfaces and watch devices.

FIG. 7 is a diagram of an exemplary predictive watch face interface and watch device. FIG. 7 indicates a watch face interface at a first point in time, 5:33 with historical data displayed for the past 6 hours and predicted data displayed for the next 6 hours. FIG. 7 does not include any predictive indicators that a breach condition is expected within the next 6 hours.

Figure 8:
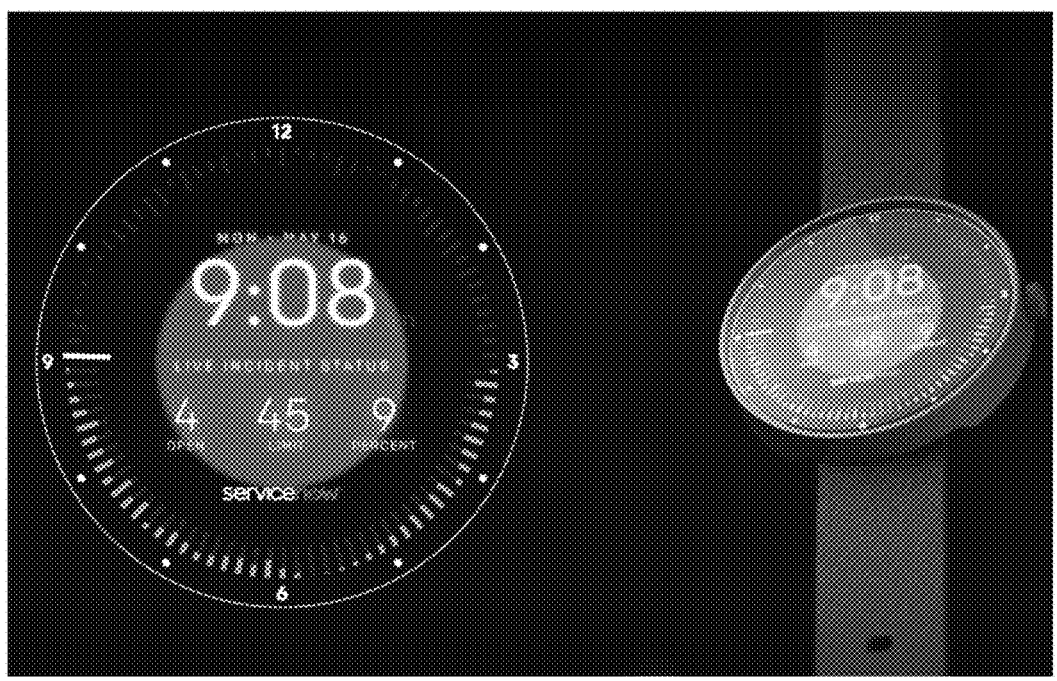

FIG. 8 is a diagram of an exemplary predictive watch face interface and watch device. FIG. 8 indicates a watch face interface at a second point in time, 9:08 with historical data displayed for the past 6 hours and predicted data displayed for the next 6 hours. FIG. 8 includes a red alert strobe in the middle of the watch device screen indicating that an alert threshold is predicted to be exceeded at a future time.

Figure 9:

FIG. 9 is a diagram of an exemplary predictive watch face interface and watch device. FIG. 9 indicates a watch face interface at a second point in time, 9:08 with historical data displayed for the past 6 hours and predicted data displayed for the next 6 hours. FIG. 9 can be the interface displayed after, for example, the interface displayed as shown in FIG. 8. The watch face display includes a red indicator that an alert threshold is predicted to be exceeded at approximately 10:45 and displays a message "INCIDENT PREDICTED."

Figure 10:
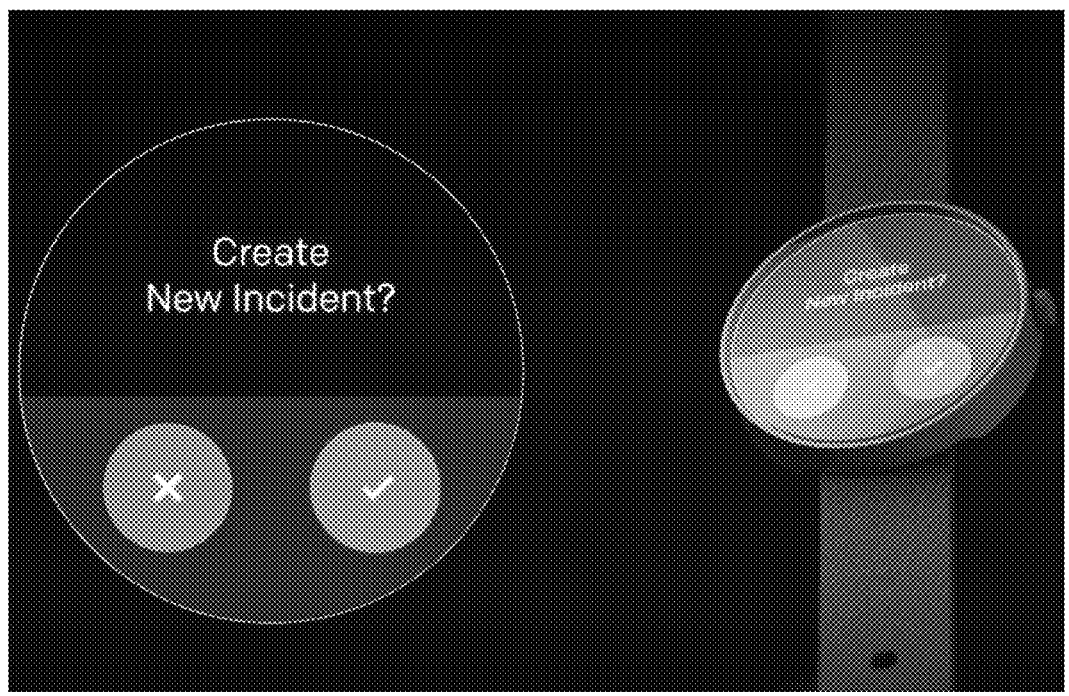

FIG. 10 is a diagram of an exemplary predictive watch face interface and watch device. FIG. 10 indicates a watch face interface prompting a user to create a new incident. FIG. 10 can be the interface displayed after, for example, the interface displayed as shown in FIG. 9. The watch face interface of FIG. 10 can be generated after an action, such as a user input action in response to the incident prediction (e.g., via a button or touch screen press), or automatically in response to a certain condition (e.g., a period of time or severity of prediction). The create new incident screen includes a check mark and an "x" which provides the user with the ability to confirm or deny creation of the incident. The incident contents can be automatically populated based on the prediction of the event and rules governing the creation of incidents responsive to watch device input.

Figure 11:

FIG. 11 is a diagram of an exemplary predictive watch face interface and watch device. The watch face interface of FIG. 11 includes a rectangular display area 1105, user interface button 1110 and user interface digital crown 1115. In such a watch device, the first and second axes can be disposed proximate to a single lower edge of the watch device display. As shown, the first axis for historical data encompasses a small portion of the bottom edge to the left of Q2. The second axis for predictive data encompasses the remainder of the bottom edge to the right of Q2. Other data and indicators can be shown similar to those described with respect to FIG. 6A. In an implementation, the user interface digital crown 1115 can be used to adjust the time period of the first and second axes and to variably display a smaller or larger time period.

Figure 12:
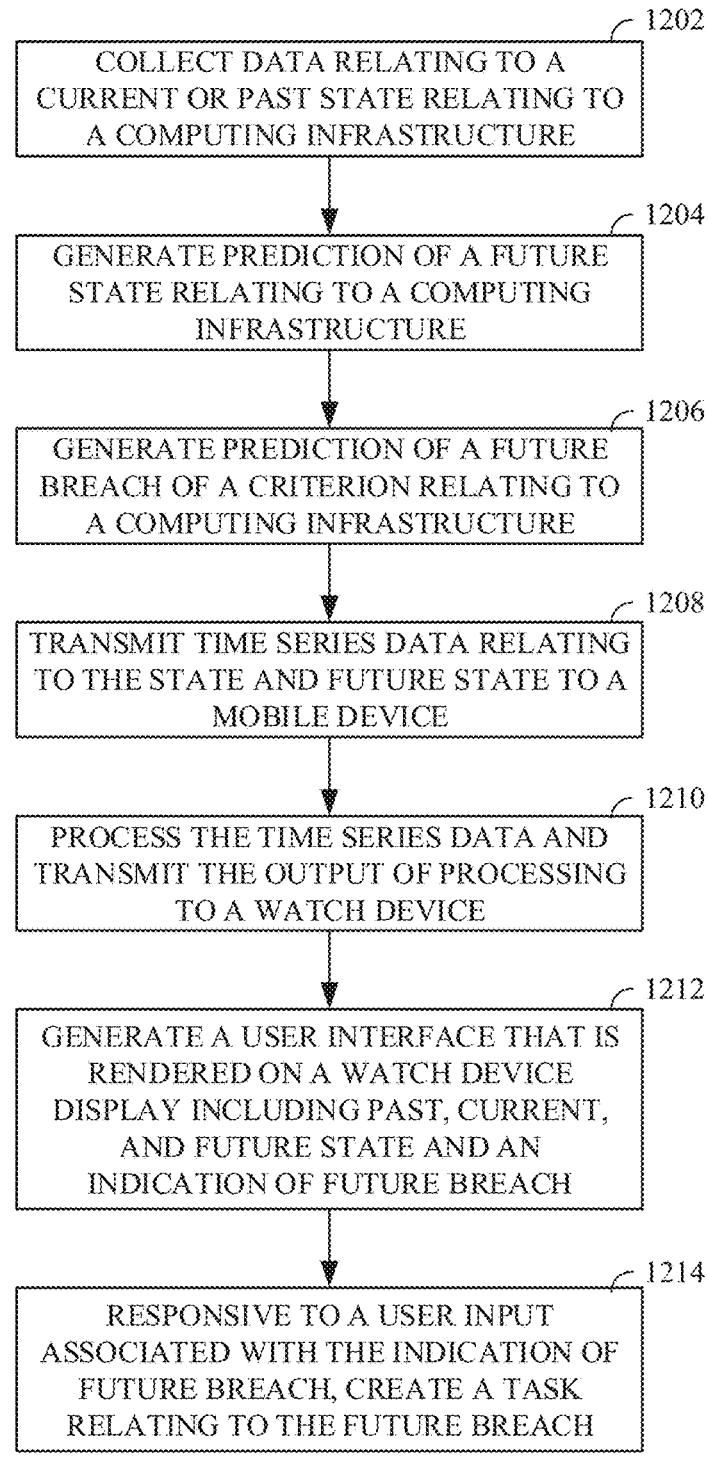
FIGS. 12-13 are flowcharts of techniques associated with a predictive watch interface.

FIG. 12 is a flowchart of a technique associated with a predictive watch interface system including a server device, watch device, and mobile device.

At step 1202, a server device may collect state data including data relating to a current or past state of a computing infrastructure. For example, in an implementation, ITSM module 608 can collect information regarding incidents relating to computing infrastructure or event management module 514 can collect information regarding events relating to computing infrastructure.

At step 1204, the server may generate a prediction of a future state of the computing infrastructure. For example, predictive module 510 can generate a prediction based on data stored in CMDB 504, Events 506, or data provided by ITSM module 508. The prediction can be generated using interpolation, machine learning, or other predictive techniques.

At step 1206, the server may generate a prediction of a future breach of a criterion relating to a computing infrastructure. For example, predictive module 510 can determine whether predicted data exceeds a threshold criterion.

At step 1208, the server may transmit signals to a mobile device. The transmitted signals may include time series data relating to the current state and future state of the computing infrastructure to a mobile device. For example, a historical data set and predictive data set can be transmitted having time periods proportional or according to the period of time to be displayed on a watch device.

In step 1210, the mobile device may process the time series data and transmit the output from the processed time series data to a watch device. For example, the mobile device may reduce the quantity of information or reformat information into a format usable by the mobile device. In an implementation, the mobile device may control a configuration of the watch device and may adjust the data to match such configuration (e.g., to match the time periods to be displayed). In an implementation, the mobile device can be configured to pass the data directly to the watch device (e.g., processing has already been performed on a server). In an implementation, the mobile device can be bypassed and data can be transmitted directly to the watch device from the server device.

In step 1212, the watch device generates a user interface that is displayed on the display of the watch device. The generated user interface may include a past, current, or future state related to the computing infrastructure as well as an indication of a predicted future breach of a criterion relating to the computing infrastructure, such as described above with respect to FIGS. 6-11. The user interface displayed on the watch device can be provided by a watch device application executed by the watch device. In an implementation, user interface elements displayed on the watch device can in addition or instead by provided by the mobile device or the server device.

At step 1214, responsive to an input associated with the indication of the predicted future breach, the server device may create a task relating to the predicted future breach. For example, as described with respect to FIG. 10, input can be provided to create a task or incident from the watch device.

Figure 13:
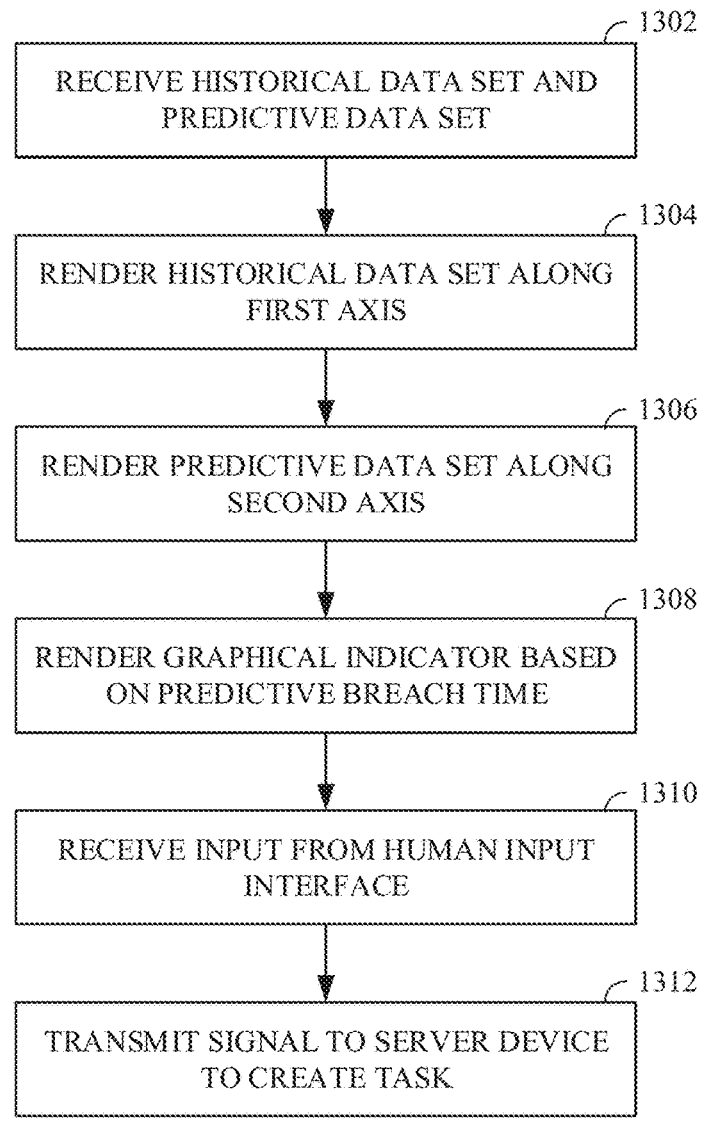

FIG. 13 is a flowchart of a technique associated with a predictive watch interface. At step 1302, the watch device can receive signals that include historical data and predictive data, through a network interface, which may be configured to receive wireless signals. In an implementation, the historical data may relate to a time period before the current time and can include data relating to one or more conditions or one or more events, which may be associated with the time period before the current time, although the historical data may include other types of data. In an implementation, the historical may include issue data, task data, issue resolution data, knowledge base data, or other forms of data related to the issue tracking systems and the management of issue tracking systems.

In an implementation, the predictive data may relate to a time period after the current time and may include data relating to one or more conditions or one or more events, which may be associated with the time period after the current time, although the historical data may include other types of data. Further, the predictive data may include an indicator of a predicted breach of at least one of the one or more conditions which may occur after the current time period.

At step 1304, the watch renders the historical data set along a first axis disposed along a first portion proximate to a first edge of the display. At step 1306, the watch renders the predictive data set along a second axis disposed along a second portion proximate to the first edge of the display, the first portion adjacent to the second portion. At step 1308, the watch renders a graphical indicator proximate to the second axis based on the predictive breach time. At step 1310, the watch receives an input from the human input interface relating to the predicted breach. At step 1312, the watch transmits a signal to a server device using the wireless network interface to create a task in task-management application software executed by a processor included in the server.

All or a portion of aspects of the invention described herein can be implemented using a general-purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing operations. Such functional blocks may be realized by any number of hardware and/or software components that perform the specified functions. For example, the described embodiments may employ various integrated circuit components (e.g., memory elements, processing elements, logic elements, look-up tables, and the like) which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A wearable device comprising:
    a display;
    a processor;
    a network interface; and
    memory, wherein the memory stores instructions configured to cause the processor to:
    receive historical data related to operation of a remote system, via the network interface, wherein the historical data includes recorded events occurring in the past;
    receive predictive data related to operation of the remote system, via the network interface, that includes predictive data of predictive events expected to occur in the future and an indicator of a predicted breach of a condition in the future;
    render historical data in the received historical data along a first axis disposed on the display;
    render predictive data in the received predictive data along a second axis disposed on display, wherein the received predictive data and the historical data together covers a period, and the period comprises a 12-hour period, a 24-hour period, a week period, or a year period, and wherein a displayed watch scale is based at least in part on the period; and render a graphical indicator on the display based on a time of the predicted breach, wherein the instructions are configured to cause the processor to render a time indicator indicating a current time between the first axis and the second axis on the display at an edge of a watch face of the display, wherein data on a first side of the time indicator indicates the historical data occurring before the current time, and data on a second side of the time indicator indicates the received predictive data predicted to occur after the current time.

2. The wearable device of claim 1, wherein the instructions are configured to cause the processor to:
receive a task creation input relating to the predicted breach; and
transmit a signal to a server using the network interface to create a task in task-management application software for the server.

3. The wearable device of claim 1, wherein the instructions are configured to cause the processor to cause an open indicator to be displayed on the display, wherein the open indicator indicates a number of open tasks for the remote system.

4. The wearable device of claim 1, wherein the display includes a round watch face, wherein the first axis is disposed along a first portion of an edge of the round watch face, and the second axis is disposed along a second portion of the edge of the round watch face adjacent to the first portion.

5. The wearable device of claim 1, wherein the instructions are configured to cause the processor to receive an adjustment input to adjust the displayed watch scale.

6. The wearable device of claim 5, wherein the adjustment input is received from a crown of the wearable device.

7. The wearable device of claim 1, wherein the display comprises a generally rectangular shape, and the first and second axes are overlaid on top of each other on a same edge of the display.

8. The wearable device of claim 1, wherein the historical data and the predictive data comprises issue data, task data, issue resolution data, or knowledge base data.

9. The wearable device of claim 1, comprising a watch device.

10. Non-transitory, computer-readable, and tangible medium storing instructions thereon that, when executed, are configured to cause a processor to:
receive data related to operation of a remote system, wherein the data includes historical data of events occurring in the past, predictive data of events expected to occur in the future, and an indicator of a predicted breach of a condition in the future;
cause display of the historical data along a first axis disposed on a display of a watch device;
cause display of predictive data along a second axis disposed on the display of the watch device, wherein the received predictive data and the historical data together covers a period, and the period comprises a 12-hour period, a 24-hour period, a week period, or a year period, and wherein a displayed watch scale is based at least in part on the period; and
cause display of a graphical indicator on the display of the watch device at a predicted time of the predicted breach, wherein the instructions are configured to cause the processor to render a time indicator indicating a current time between the first axis and the second axis on the display at an edge of a watch face of the display, wherein data on a first side of the time indicator indicates the historical data occurring before the current time, and data on a second side of the time indicator indicates the received predictive data predicted to occur after the current time.

11. The non-transitory, computer-readable, and tangible medium of claim 10, wherein the instructions are configured to cause the processor to:
cause display of an initial watch face; and
receive input causing display of data relating to a pending task.

12. The non-transitory, computer-readable, and tangible medium of claim 10, wherein the instructions are configured to cause the processor to:
cause display of an initial watch face;
determine that the condition has occurred or is to occur;
responsive to the determination has the condition has occurred, generate a pending task related to the condition;
receive an input; and
cause the display of data relating to the pending task.

13. The non-transitory, computer-readable, and tangible medium of claim 12, wherein the condition comprises a low disk space condition.

14. The non-transitory, computer-readable, and tangible medium of claim 13, wherein the predicted breach comprises an out-of-space state.

15. The non-transitory, computer-readable, and tangible medium of claim 12, wherein the condition comprises a time at which the predicted breach was expected or the predicted breach has a severity greater than a threshold level.

16. The non-transitory, computer-readable, and tangible medium of claim 12, wherein the instructions are configured to cause the processor to cause display of an alert of the condition, wherein the alert comprises an alert strobe or a change of color of one or more items on the display.

17. The non-transitory, computer-readable, and tangible medium of claim 12, wherein the instructions are configured to cause the processor to cause an indication of an alert of the condition, wherein the alert comprises a vibration of the watch device.

18. The non-transitory, computer-readable, and tangible medium of claim 10, wherein the instructions are configured to cause the processor to:
receive selection of a point in time in the data;
responsive to the selection of the point in time, cause display of additional information related to the point in time.

19. The non-transitory, computer-readable, and tangible medium of claim 12, wherein the instructions are configured to cause the processor to:
receive an adjustment input; and
responsive to the adjustment input, adjust a proportion of an amount of displayed historical data to an amount of displayed predictive data.

20. The non-transitory, computer-readable, and tangible medium of claim 10, wherein the time of the predicted breach corresponds to a potential time for the breach.

21. The non-transitory, computer-readable, and tangible medium of claim 10, wherein the time of the predicted breach corresponds to a time period window for the predicted breach.

* * * * *